US008011778B2

(12) United States Patent
Harada et al.

(10) Patent No.: US 8,011,778 B2
(45) Date of Patent: Sep. 6, 2011

(54) SEALANT FOR INK JET HEAD, INK JET HEAD, AND INK JET RECORDING APPARATUS

(75) Inventors: Kouji Harada, Tokyo (JP); Isao Imamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 12/135,977

(22) Filed: Jun. 9, 2008

(65) Prior Publication Data

US 2008/0317942 A1 Dec. 25, 2008

(30) Foreign Application Priority Data

Jun. 19, 2007 (JP) ................................ 2007-161431

(51) Int. Cl.
*C09D 11/00* (2006.01)

(52) U.S. Cl. ....................................................... 347/100

(58) Field of Classification Search ................... 347/100
See application file for complete search history.

(56) References Cited

U.S. PATENT DOCUMENTS 5,524,784 A 6/1996 Shiba et al.
5,663,752 A 9/1997 Imamura et al.
5,738,911 A 4/1998 Imamura et al.
5,770,271 A 6/1998 Imamura
5,980,026 A 11/1999 Imamura et al.
6,123,410 A 9/2000 Beerling et al.
6,291,545 B2 9/2001 Imamura
6,409,931 B1 6/2002 Shimomura et al.
6,586,495 B1 7/2003 Shimomura et al.
6,713,128 B2 3/2004 Shimomura et al.
6,750,290 B2 6/2004 Imamura et al.
6,846,520 B2 1/2005 Shimomura et al.
6,869,541 B2 3/2005 Shimomura et al.
2003/0094738 A1* 5/2003 Maeda et al. ................. 264/494
2003/0112307 A1* 6/2003 Maeda et al. ................. 347/102
2004/0155931 A1* 8/2004 Mori ............................... 347/58
2006/0162771 A1 7/2006 Inoue et al.
2007/0142491 A1 6/2007 Otaka et al.

FOREIGN PATENT DOCUMENTS

JP 2002208652 7/2002
JP 2002302536 10/2002
WO 2004/075333 A1 9/2004

OTHER PUBLICATIONS

J. V. Crivello, et al, "New Photoinitiators for Cationic Polymerization", J. Polymer SCI: Symposium No. 56, (1976) pp. 383-395.
Chinese Official Action dated Nov. 24, 2010 in Application No. 200810111460.6.

* cited by examiner

*Primary Examiner* — Laura Martin

(74) *Attorney, Agent, or Firm* — Fitzpatrick, Cella, Harper & Scinto

(57) ABSTRACT

A sealant for an ink jet head includes at least an oxetane compound having a biphenyl skeleton, an alicyclic epoxy compound, and a cationic polymerization initiator.

9 Claims, 8 Drawing Sheets

SEALANT FOR INK JET HEAD, INK JET HEAD, AND INK JET RECORDING APPARATUS

BACKGROUND OF THE INVENTION

1. Field of the Invention

The present invention relates to a sealant used for an ink jet head mounted on an ink jet recording apparatus for recording by ejecting ink to a recording sheet, an ink jet head, and an ink jet recording apparatus.

2. Description of the Related Art

An ink jet head used in an ink jet recording apparatus includes a discharge element substrate on which electrothermal transducers generating energy for discharge are provided. Electric pulses used for driving the electrothermal transducers are applied from the outside using a wiring substrate or the like. The wiring board and the discharge element substrate are electrically connected to each other by inner lead bonding (ILB). Such an electric connection portion is sealed with a sealant or an adhesive in order to prevent corrosion and short-circuiting of electrodes and wiring, which contribute to electric connection, due to mist of the ink filled at the time of discharge.

FIG. 1 shows an example of a configuration of a conventional ink jet head using a sealant or an adhesive for electronic mounting. FIG. 2 is an enlarged sectional view of the vicinity of an electric connection taken along line II-II in the ink jet head shown in FIG. 1. In FIG. 2, reference numerals 121 and 122 each denote a supply port for supplying an ink to a discharge orifice 105. A discharge element substrate 101 includes a discharge orifice 105, an energy generating element (not shown), an electronic circuit element (not shown), and a driving electrode 107 provided on the same surface as the discharge orifice 105. The driving electrode 107 is electrically connected to a connection electrode 108 of the wiring board 102 (hereinafter referred to as a "surface electrode configuration"). In addition, the discharge element substrate 101 is fixed to a support member 103 with an adhesive 131, and the space between the side surface of the discharge element substrate 101 and the support member 103 is sealed with a sealant 110. The connection between the driving electrode 107 and the connection electrode 108 is sealed with sealants 110 and B 111 so as to be protected from an ink. In such a configuration, the sealant is thickly formed for preventing short-circuiting and migration in an electrode portion. When the thickness of the sealant is determined, the shortest distance between the discharge orifice and recording paper is inevitably determined. Since the landing accuracy during ink discharge improves as the distance (paper distance) from the recording paper decreases, a configuration including a thinned sealant has the large problem of securing electric sealing reliability in order to improve print quality. Further, in the use of a recording head, a recording medium or the like may come into contact with a sealing portion due to paper jam. Therefore, a configuration including a sealing portion opposed to a recording medium is required to have mechanical strength.

U.S. Pat. No. 6,123,410 proposes a configuration in which a driving electrode is provided on a surface opposite to a discharge orifice of a discharge element substrate and is electrically connected to a connection electrode formed on a support substrate (hereinafter referred to as a "back electrode configuration"). FIG. 3 is a sectional view of a head configuration disclosed in U.S. Pat. No. 6,123,410. An ink supply port 242 is formed on the back of a surface of a print head 218 where a discharge orifice 238 is formed, and a driving electrode 284 is provided near the ink supply port 242 and is electrically connected, through a solder bump 200, to a connection electrode 285 on a surface of a support substrate 220 on which electric wiring is formed. Further, the solder bump 200 used for mounting the support substrate 220 and the print head 218 is formed in a ring around the ink supply port 242 so as to function as a fluid boundary for the ink supply port 242. The solder functioning as the fluid boundary is corroded with some kinds of ink to form a space in the ring, thereby causing ink penetration into an inner electrode connection portion and an ink leakage. Further, the corrosion of the electric connection may cause defective electric connection. Therefore, there has been disclosed a method for forming a fluid division wall by under-filling a sealant (adhesive) after the connection between both electrodes and the bump.

However, in the above-described configuration, for example, when the bump is formed near the opening of the ink supply port, the sealant which covers the bump is applied so as not to sag and clog the ink supply port, and thus the seal region is narrowed, thereby significantly decreasing the sealant thickness between the sealant and an ink. In this state, the sealant constantly contacts an ink, and thus migration may occur between the electrodes due to ink absorption (water absorption) of the sealant itself. Alternatively, because the bonding area is narrow, the sealant may be scraped due to a reduction in adhesive force, thereby causing a short-circuit. For the above-mentioned reasons, it is very difficult to maintain adhesiveness and electric sealing reliability.

On the other hand, Japanese Patent Laid-Open No. 2002-208652 discloses a sealant containing an oxetane compound. In addition, Japanese Patent Laid-Open No. 2002-302536 discloses an ink jet head using an oxetane compound.

In these documents, 1,4-bis[(3-ethyl-3-oxetanylmethoxy) methyl]benzene is exemplified as the oxetane compound. However, the sealant disclosed in Japanese Patent Laid-Open No. 2002-208652 is applied to general electronic devices, and thus the performance in such a severe environment that the sealant contacts an ink is not described. In Japanese Patent Laid-Open No. 2002-302536, ink resistance is evaluated only by a swelling rate, the influence of an eluate of a sealant cured product into an ink is not described, and an acceptance or rejection criteria for evaluating the swelling rate is 5%. A region with a swelling rate lower than this (low water absorption) is not described.

A sealant or adhesive used for an ink jet head contains alkali and polar solvents and has the large problem of maintaining the characteristics described below in a severe environment in which it contacts an ink exhibiting properties which change with color.

(a) Low-Temperature Curability

Since a plurality of different materials is used in constituent members of an ink jet head, low-temperature curability is required for suppressing deterioration in the materials due to heating of curing and warping of the members due to differences in expansion between the different materials.

(b) Bonding Reliability

It is necessary to maintain bonding reliability between the members having different expansion coefficients and composed of a plurality of different materials such as an organic/inorganic material, a noble metal, and the like.

(c) Electric Sealing Reliability

It is necessary to suppress a defective connection caused by corrosion, short-circuiting, or migration accelerated by ink absorption of electrodes and wiring which contribute an electric connection.

Further, an ink jet head with the surface electrode configuration or back electrode configuration has a large problem with bonding reliability and electric sealing reliability in a thinned state required for a sealing material.

SUMMARY OF THE INVENTION

The present invention provides an ink jet head having high reliability.

In accordance with an embodiment of the present invention, a sealant for an ink jet head includes at least an oxetane compound having a biphenyl skeleton, an alicyclic epoxy compound, and a cationic polymerization initiator.

Therefore, it is possible to provide a sealant or an adhesive for an ink jet head which can be cured at a low temperature and which can maintain high bonding reliability and high sealing reliability in a severe environment in which it contacts an ink containing alkali and polar solvents.

Although it is generally necessary to thickly apply a sealant in view of electric sealability, the sealant for an ink jet head of the present invention can be thinly applied. Therefore, for example, in the surface electrode configuration, the paper distance can be decreased to improve print quality. In addition, in the back electrode configuration, even when the thickness of a sealant to an ink is small, high bonding reliability and high sealing reliability can be achieved, and coating accuracy in a micro region can be relaxed, thereby improving productivity.

These effects enable the production of an ink jet head having high reliability at low cost.

Further features of the present invention will become apparent from the following description of exemplary embodiments (with reference to the attached drawings).

DESCRIPTION OF THE EMBODIMENTS

Figure 1:
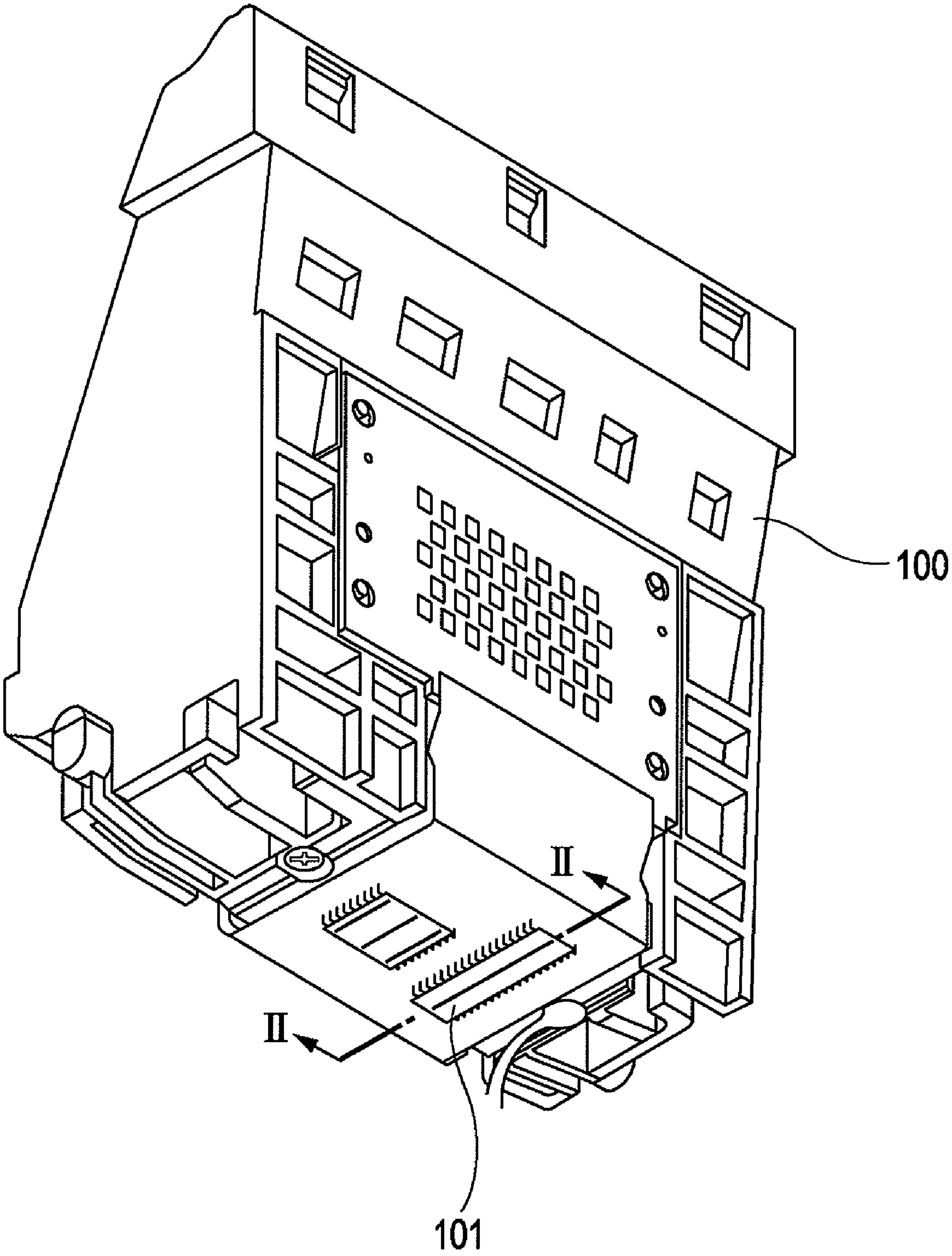
FIG. 1 PRIOR ART
FIG. 1 is a perspective view showing an example of a conventional ink jet head.
Figure 2:
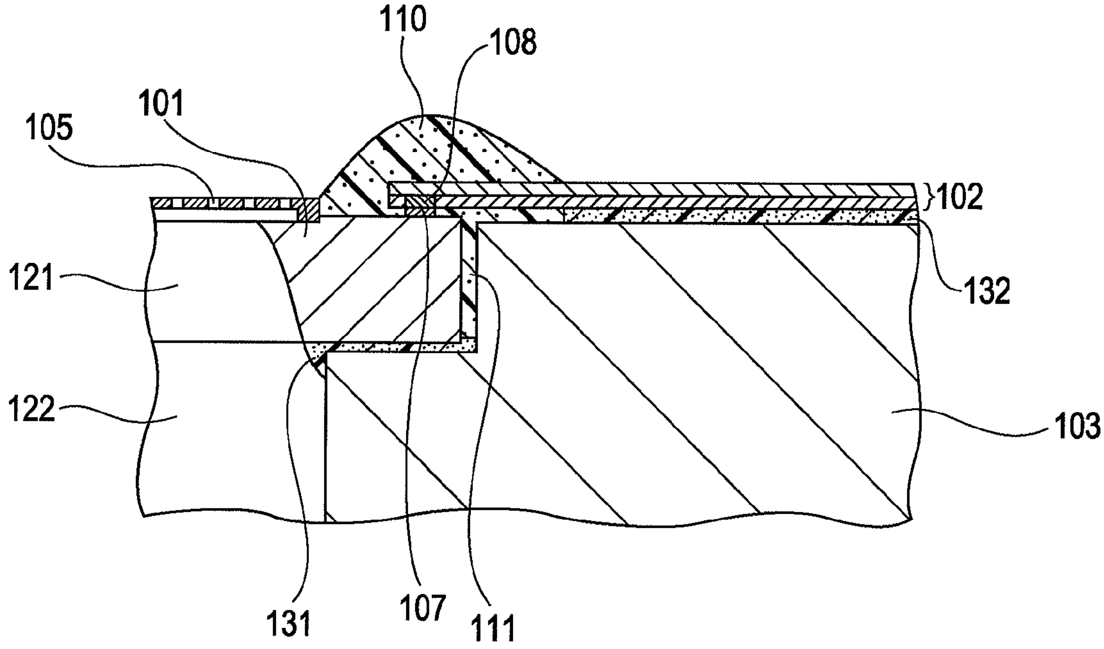
FIG. 2 PRIOR ART
FIG. 2 is an enlarged sectional view of an end of a substrate in the longitudinal direction, taken along line II-II in FIG. 1.
Figure 3:
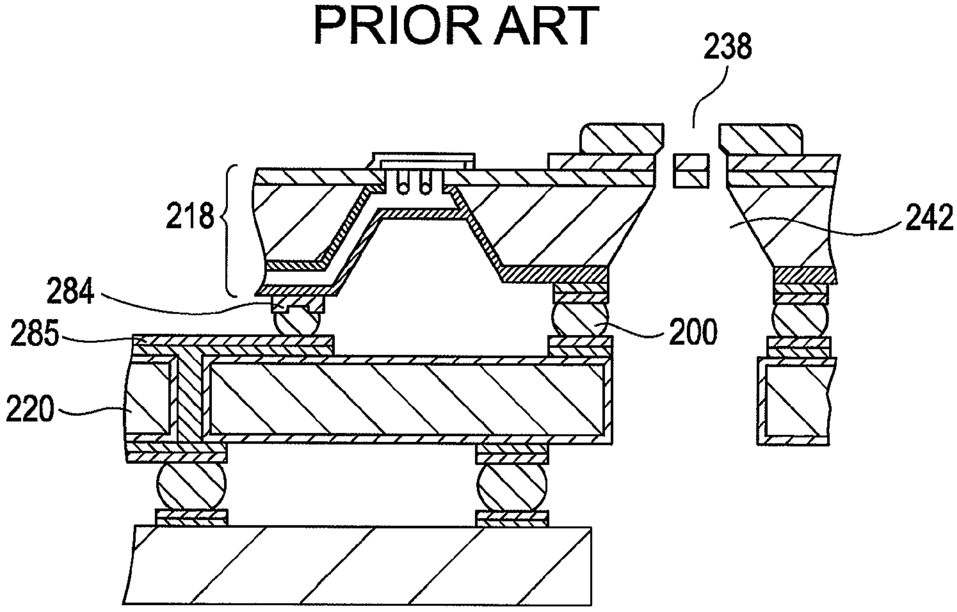
FIG. 3 PRIOR ART
FIG. 3 is an enlarged view of the vicinity of an electric connection in a conventional ink jet head with a surface electrode configuration.

An embodiment of the present invention will be described below with reference to the drawings.

In the description below, components having the same function are denoted by the same reference numeral, and a description thereof may be omitted.

An ink jet head can be mounted on apparatuses such as a printer, a copying machine, a facsimile having a communication system, a word processor having a printer portion, and the like, and industrial recording apparatuses combined with various processing devices. The ink jet head permits recording on various recording media, such as paper, yarns, fibers, clothes, leather, metals, plastics, glass, wood, and ceramics. In the present invention, the term "recording" means not only that an image having a meaning, such as a character or a figure, is applied to a recording medium but also that an image without a meaning, such as a pattern, is applied to a recording medium.

The term "ink" or "liquid" should be interpreted in a broad sense and means a liquid to be supplied to the formation of an image, a figure, or a pattern, processing of a recording medium, or a treatment of an ink or a recording medium. Examples of a treatment of an ink or a recording medium include an improvement of fixing property by solidification or insolubilization of a colorant in an ink applied to a recording medium, an improvement of recording quality or coloring property, and an improvement of image durability.

A sealant or an adhesive used in an ink jet head according to an embodiment of the present invention is described below.

An example of a sealant or an adhesive used in an ink jet head according to an embodiment of the present invention contains at least an oxetane compound having a biphenyl skeleton, an alicyclic epoxy compound, and a cationic polymerization initiator.

As the oxetane compound having a biphenyl skeleton, a compound containing two or more oxetane rings, particularly a compound represented by general formula (I), can be used. In particular, from the viewpoint of reactivity and physical properties of a cured product, such as toughness and the like, a resin represented by general formula (III) can be used.

General Formula (I)

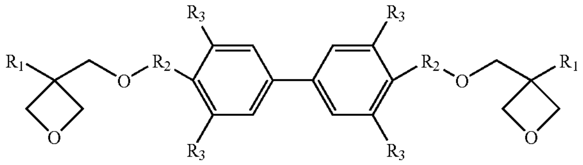

wherein $R_1$ represents an alkyl group, $R_2$ represents $—(CH_2)_p—$ (wherein p is 0 or 1), and $R_3$ represents a hydrogen atom or an alkyl group.

General Formula (III)

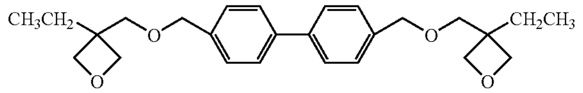

The expression "having a biphenyl skeleton" represents "having a structure in which two benzene rings are bonded through a single bond".

As the alicyclic epoxy compound, a polyhydric alcohol polyglycidy ether having at least one alicyclic ring, a cyclohexane oxide structure-containing compound obtained by epoxidating cyclohexene and a cyclopentene ring-containing compound with an oxidizing agent, or a vinylcyclohexane oxide structure-containing compound obtained by epoxidating a cyclopentene oxide structure-containing compound or a vinylcyclohexane structure-containing compound with an oxidizing agent can be used. Examples of such compounds include the following:

hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylcyclohexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; 2-(3,4-epoxycyclohexyl-5,5-spiro-3,4-epoxy)cyclohexane-metadioxane; bis(3,4-epoxycyclohexylmethyl) adipate; vinylcyclohexane dioxide; 4-vinylepoxycyclohexane; bis(3,4-epoxy-6-methylcyclohexylmethyl) adipate; 3,4-epoxy-6-methylcyclohexyl carboxylate; methylenebis(3,4-epoxycyclohexane); dichloropentadiene diepoxide; ethylene glycol di(3,4-epoxycyclohexylmethyl) ether; ethylenebis(3,4-epoxycyclohexane carboxylate); dioctyl epoxyhexahydrophthalate; and di-2-ethylhexyl epoxyhexahydrophthalate.

Among these, a resin represented by general formula (II) is desirably used from the viewpoint of reactivity.

General Formula (II)

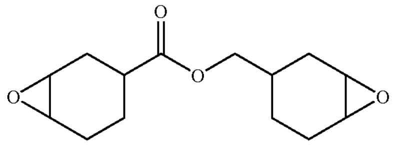

The amount of the oxetane compound mixed is 10 to 90 parts by mass relative to 100 parts by mass of the resin. When the amount is less than 10 parts by mass, the rate of ink absorption (described below) is little decreased, and the effect of improving migration resistance (described below) is not sufficiently obtained. When the amount exceeds 90 parts by mass, an unreacted oxetane compound remains, and thus the liquid contact property (described below) is not improved, and the compound may be eluted into an ink and change the physical properties of the ink. In particular, the amount is 60 to 80 parts by mass because a significant effect can be obtained on decreasing the ink absorption rate and improving the liquid contact property and migration resistance.

A thermal cationic polymerization initiator, a photo cationic polymerization initiator, or both may be used as the cationic polymerization initiator. When the photo cationic curing agent is used, since the sealant can be cured by light at room temperature, no stress occurs due to a difference in expansion, and the sealant advantageously functions to adhesiveness. In addition, the surface of the sealant can be instantaneously cured by appropriately selecting the quantity of light irradiated, and thus entrance into an unnecessary portion can be suppressed.

For example, an aromatic sulfonium salt can be used as the thermal cationic polymerization initiator. Examples of commercially available thermal cationic polymerization initiators include San-Aid SI-60L (trade name), San-Aid SI-80L (trade name), and San-Aid SI-100L (trade name) which are placed on the market by Sanshin Chemical Industry Co., Ltd., and CP-66 (trade name) and CP-77 (trade name) which are placed on the market by Adeka Corporation. A combination of an aromatic onium salt and a reducing agent may be used.

As the photo cationic polymerization initiator, an aromatic diazonium salt, an aromatic sulfonium salt, an aromatic iodonium salt, or the like can be used. An aromatic onium salt described in J. POLYMER SCI: Symposium No. 56, 383-395 (1976) may be used. Examples of commercial photo cationic polymerization initiators include Irgacure 261 (trade name) placed on the market by Ciba Geigy, SP-150 (trade name) and SP-170 (trade name) which are placed on the market by Adeka Corporation, Triazine A, Triazine PMS, Triazine PP, and Triazine B which are placed on the market by Nihon Sibel Hegner K. K., and Photoinitiator 2074 placed on the market by Rhodia Japan.

In addition, various additives can be used for the sealant of the present invention according to demand. For example, a silane coupling agent as an adhesiveness improver, a filler for adjusting viscosity, and the like can be used.

As the silane coupling agent, a compound with high reactivity to cations is desired. Examples of such a compound include alicyclic epoxy-type A-186 manufactured by Nippon Unicar Co., Ltd., and oxetane-type TESOX manufactured by Toagosei Co., Ltd. In the present invention, the silane coupling agent is added for decreasing the ink absorption rate and improving the liquid contact property and migration resistance.

Further, since the sealant of the present invention has very low viscosity, the viscosity is adjusted by adding the filler within a range in which the performance as a sealant is not impaired, thereby permitting wide use in various portions.

Although the present invention is described in detail below with reference to examples and comparative examples, the present invention is not limited to these examples. Hereinafter "parts" represents "parts by mass".

EXAMPLES 1 to 4 AND COMPARATIVE EXAMPLES 1 TO 3

A sealant having each of the compositions shown in Table 1 was prepared as an example of the sealant for an ink jet head of the present invention.

TABLE 1

| | Example 1 | Example 2 | Example 3 | Example 4 | Comp. Example 1 | Comp. Example 2 | Comp. Example 3 |
|---|---|---|---|---|---|---|---|
| Exemplified compound (1) Biphenyl skeleton oxetane | 80 | 60 | 80 | 60 | 100 | | |
| Exemplified compound (2) Alicyclic epoxy | 20 | 40 | 20 | 40 | | 100 | 20 |

TABLE 1-continued

| | Example 1 | Example 2 | Example 3 | Example 4 | Comp. Example 1 | Comp. Example 2 | Comp. Example 3 |
|---|---|---|---|---|---|---|---|
| Exemplified compound (3) Oxetane | | | | | | | 80 |
| Cationic polymerization initiator (ADEKA, CP-77) | 1 | 1 | 1 | 1 | 1 | 1 | 1 |
| Silane coupling agent (Nippon Unicar, A186) | | | 5 | 5 | | | |

In Examples 1 and 2, an oxetane compound having a biphenyl skeleton represented by Exemplified Compound (1) below and an alicyclic epoxy compound represented by Exemplified Compound (2) below were used as resin contents in different amounts. In Examples 3 and 4, a silane coupling agent was further added.

In addition, only Exemplified Compound (1) was used as a resin content in Comparative Example 1, only Exemplified Compound (2) was used as a resin content in Comparative Example 2, and a mixture of Exemplified Compound (2) and Exemplified Compound (3) was used as a resin content in Comparative Example 3.

Exemplified Compound (1)

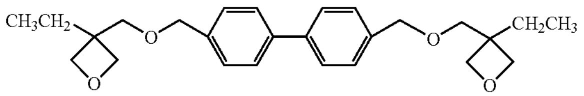

Exemplified Compound (2)

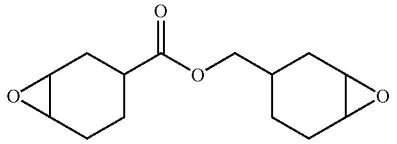

Exemplified Compound (3)

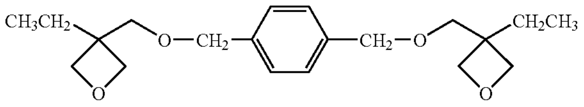

All sealants shown in Table 1 were cured at 100° C. for 1 hour and at 180° C. for 1 hour, and the cured products were evaluated by the tests described below with respect to the ink absorption rate, liquid contact property, and ion migration resistance.

<Evaluation of Ink Absorption Rate>

The cured product of the sealant of each of the examples and the comparative examples was immersed in an ink (i) and stored at 121° C. for 10 hours in PCT (pressure cooker test) to measure a rate of weight change before and after storage.

Ink (i): pure water/glycerin/Direct Black 154 (water-soluble black dye)=65/30/5 (ratio by mass)

The evaluation criteria of the rate of weight change were as follows:

A: less than 1%

B: 1% to less than 2%

C: 2% to less than 4%

D: 4% or more

<Liquid Contact Property>

The cured product of the sealant of each of the examples and the comparative examples was immersed in a clear ink prepared by removing Direct Black 154 from the ink (i) and stored at 121° C. for 10 hours in PCT (pressure cooker test) to measure the appearance and absorbance of an extract of the clear ink. The absorbance was measured at 200 nm to 400 nm using U-3300 spectrophotometer (manufactured by HITACHI). Hereinafter, "abs" indicates a value obtained by subtracting the absorbance of the clear ink in which the cured product was not immersed from the absorbance of the extract of the clear ink after the storage.

A: abs of less than 1

B: abs of 1 to less than 2

C: abs of 2 or more

<Ion Migration Resistance>

Two pseudo-electrodes (hereinafter referred to as "Ni/Au electrodes") composed of gold-plated nickel were formed with a space of 100 μm on a substrate and coated by applying each sealant to a thickness of 100 μm from the surface of the electrodes. The resultant sample was immersed in the ink (i) and stored at 60° C. and humidity of 90% with a voltage of 25 V applied between both electrodes. A storage time required until an end of a metal deposit formed on the anode side reached the opposite electrode side due to migration to cause short circuiting was evaluated.

A: 1000 hours or more

B: 500 hours to less than 1000 hours

C: less than 500 hours

The evaluation results of the ink absorption rate, liquid contact property, and ion migration resistance are shown in Table 2.

TABLE 2

| | Example 1 | Example 2 | Example 3 | Example 4 | Comp. Example 1 | Comp. Example 2 | Comp. Example 3 |
|---|---|---|---|---|---|---|---|
| Evaluation of ink absorption rate | B | B | A | A | D | D | C |

TABLE 2-continued

| | Example 1 | Example 2 | Example 3 | Example 4 | Comp. Example 1 | Comp. Example 2 | Comp. Example 3 |
|---|---|---|---|---|---|---|---|
| Evaluation of liquid contact property | B | B | A | A | D | D | C |
| Evaluation of ion migration resistance | A | A | A | A | C | C | B |

In Comparative Example 1, the liquid contact property was poor, and absorption possibly due to a monomer was observed. It is thus thought that an unreacted product was eluted due to low reactivity. In Comparative Example 2, the ink absorption rate, liquid contact property, and ion migration resistance were poor. Therefore, as in Comparative Examples 1 and 2, the sealant containing only the Exemplified Compound (1) or (2) was not desired. The results of Comparative Example 3 and the other comparative examples were the same in varying degrees. Further, in the evaluation of ion migration resistance, all sealants of Comparative Examples 1 to 3 could not be stored for 1000 hours.

In comparison to the results of the comparative examples, Examples 1 to 4 showed good results of ink absorption rate, liquid contact property, and ion migration resistance. In particular, Examples 3 and 4 to each of which the silane coupling agent was added showed significant improvements.

These results indicate that the desired amount of the oxetane compound having a biphenyl skeleton relative to the total weight of the oxetane compound having a biphenyl skeleton and the alicyclic epoxy compound is 40 parts by weight to 80 parts by weight.

The sealants of Examples 1 to 4 have a very low viscosity of 10 Pa·s or less at 25° C. and 5 rpm. Therefore, the space in an electrode portion of wiring or the like can be filled within a short time, thereby improving sealing reliability and productivity. Further, the viscosity can be adjusted within a wide range by adding a filler or the like, and thus the sealants can be used in various positions.

(Ink Jet Head)

Next, an ink jet head in which an electrode portion is sealed with the sealant of the present invention is described as an example of an ink jet head in which an electrode portion is protected by a sealant. Unless otherwise specified, the adhesive or sealant represents a composition during application and before curing, and a bonding member (joint member) or sealing member represents a cured member incorporated into an ink jet head.

(First Example of Ink Jet Head)

Figure 4:
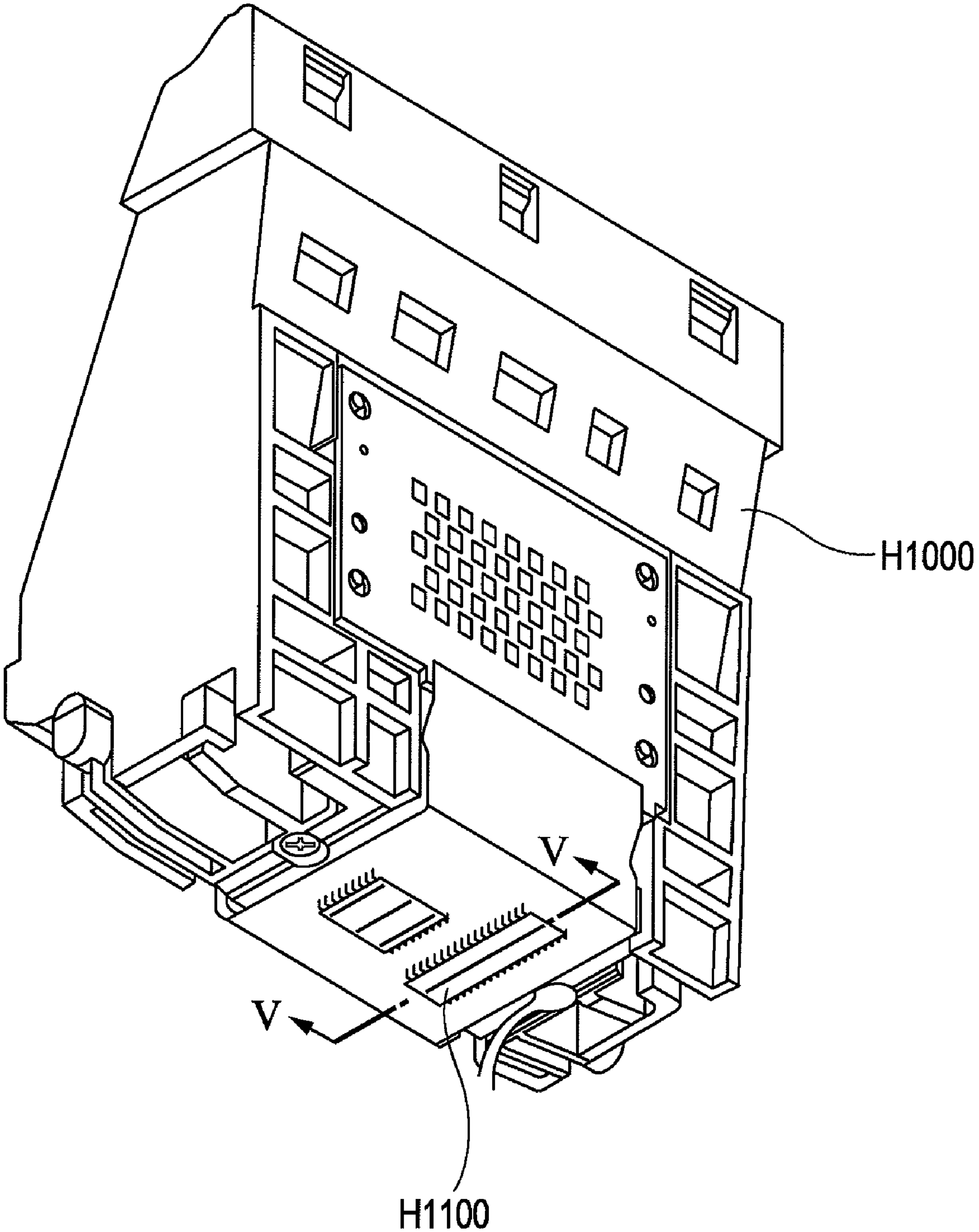
FIG. 4 is a perspective view showing an ink jet head with a surface electrode configuration (first example of an ink jet head) according to an embodiment of the present invention.
Figure 5:
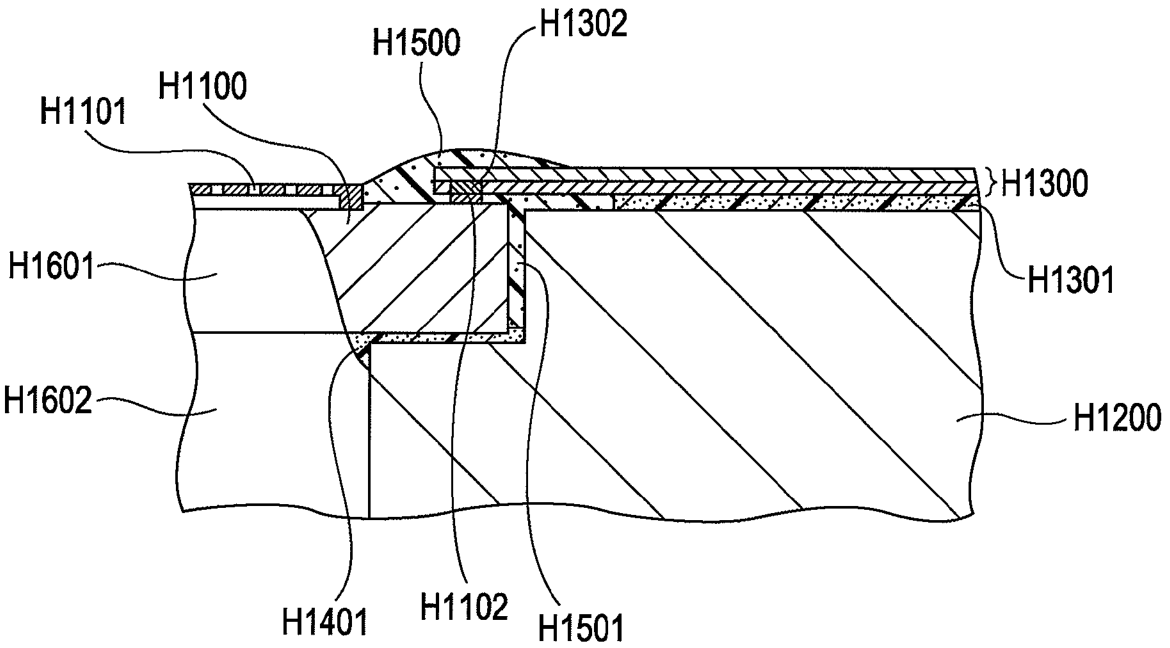
FIG. 5 is an enlarged sectional view of an end of a substrate in the longitudinal direction, taken along line V-V in FIG. 4.

FIG. 4 is a perspective view showing the appearance of an example of an ink jet head according to an embodiment of the present invention. FIG. 5 is a schematic enlarged sectional view of the vicinity of an electric connection portion, taken along line V-V in FIG. 4.

An ink jet head H1000 includes a discharge element substrate H1100. The discharge element substrate H1100 includes a discharge orifice H1101 formed in the surface thereof, and an energy generating element (not shown) generating energy used for discharging an ink, and an electronic circuit element (not shown) for driving the element. A driving electrode H1102 provided on a surface (on the side where the discharge orifice is formed) of the discharge element substrate H1100 is electrically connected to a connection electrode H1302 possessed by a wiring member H1300 which supplies an electric control signal and a driving signal to the discharge element substrate H1100. In the example of an ink jet head, hereinafter, among electrodes which give and receive an electric signal for driving the energy generating element, the electrode provided on the discharge element substrate (a silicon substrate having discharge orifices and energy generating elements) side is referred to as a "driving electrode". While the electrode connected to the driving electrode and provided on the wiring member (a TBC, a printed wiring board, or the like) side is referred to as a "connection electrode". The discharge element substrate H1100 has a first ink supply port H1601 which supplies an ink to a passage connected to the energy generating element. The discharge element substrate H1100 is fixed to a support member H1200 having a second ink supply port 1602 with a first bonding member H1401 so that the first ink supply port H1601 and the second ink supply port H1602 communicate with each other. The wiring substrate H1300 is fixed to the support member H1200 with a second bonding member H1301. The connection portion between the driving electrode H1102 and the connection electrode H1302 is covered with a first sealing member H1500 and a second sealing member H1501 and protected from an ink. In this case, for example, an example of the sealant for an ink jet head of the present invention can be used in the first sealing member H1500.

Figure 6A:
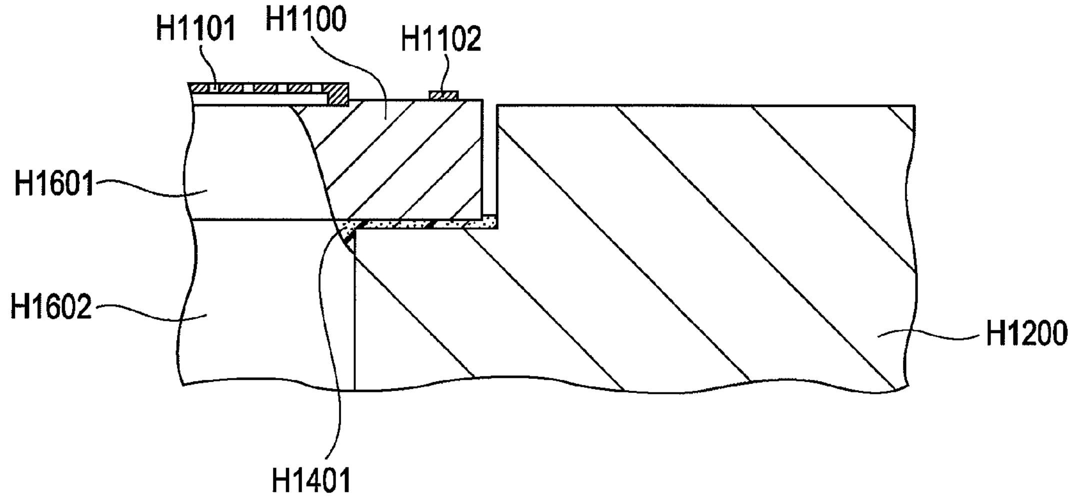
FIGS. 6A, 6B, and 6C are enlarged views of the vicinity of an electric connection in step 1, step 2, and step 3, respectively, for illustrating a method for manufacturing a surface electrode configuration (first example of an ink jet head) according to an embodiment of the present invention.
Figure 6B:
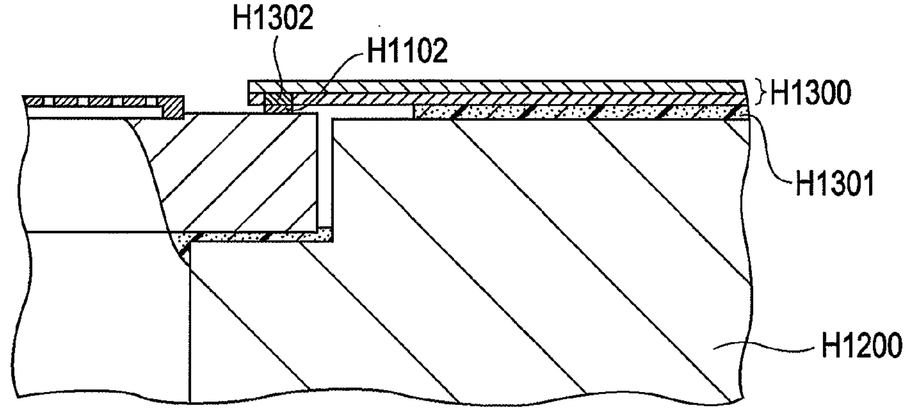
Figure 6C:
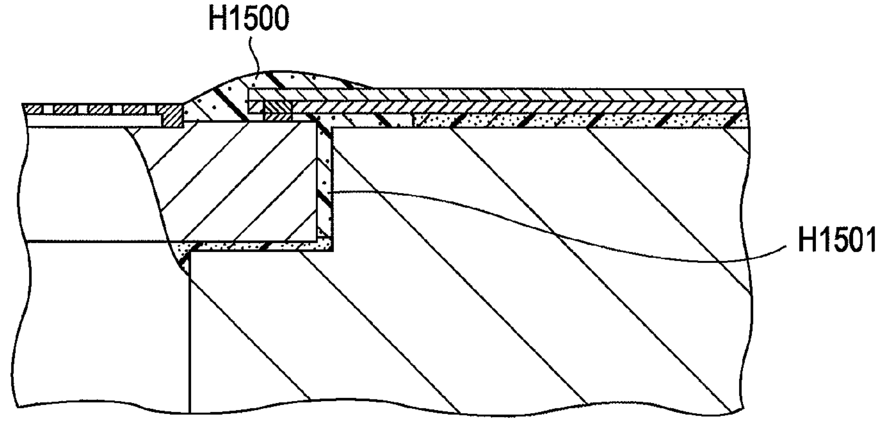

FIGS. 6A to 6C are schematic sectional views illustrating an example of a manufacturing method including a step of coating an electrode portion with a sealing member in the ink jet head as the first example. FIGS. 6A to 6C are sectional views taken along the same line as in FIG. 5. Each of the steps will be described below.

[Step 1: Bonding the Discharge Element Substrate H1100 to the Support Member H1200]

As shown in FIG. 6A, a first adhesive H1401 is applied by transfer at a predetermined position on the support member H1200, and then the discharge element substrate H1100 is pressure-bonded so that the first ink supply port H1601 and the second ink supply port H1602 communicate with each other. Then, the first adhesive H1401 is cured under predetermined curing conditions to bond together the discharge element substrate H1100 and the support member H1200. After curing, the adhesive H1401 becomes the bonding member H1401.

[Step 2: Electrically Connecting the Discharge Element Substrate H1100 and the Wiring Substrate H1300]

As shown in FIG. 6B, the wiring substrate H1300 is bonded to the support member H1200 with the first bonding member H1301 so that the driving electrode H1102 on the surface of the discharge element substrate H11100 can be connected to the connection electrode H1302 on the wiring substrate H1300. Next, the driving electrode H1102 is electrically connected to the connection electrode H1302 by inner lead bonding (ILB).

[Step 3: Coating the Electrode Connection Portion with the Sealant]

As shown in FIG. 6C, the second sealant H1501 is applied, by dispensing, to the space surrounded by a side surface of the discharge element substrate H1100, the support member H1200, and the wiring substrate H1300 and the connected electrode portion and then cured under predetermined conditions. Then, the sealant for an ink jet head of the present invention is applied as the first sealant H1500 to the vicinity of the connected electrode portion so as not to coat a nozzle portion (near the discharge orifice) of the discharge element substrate H1100. The sealant is then cured under predetermined curing conditions to form the sealing member H1500. As a result, the electric connection portion is completely covered.

Although the first adhesive H1401 is applied by transfer in the step 1, a commonly used coating method such as dispersing, printing, or the like may be used in view of productivity.

Although the driving electrode H1102 and the connection electrode H1302 are connected to each other using ILB in the step 2, a commonly used connection method such as one utilizing metal bumps, wire bonding, an anisotropic conductive adhesive, or the like may be used.

Further, the sealant for an ink jet head of the present invention is used only as the first sealant H1500 in the steps 1 and 3, but the use of the sealant of the present invention is not limited to this. For example, when the sealant of the present invention is used as each of the first sealant H1500 and the second sealant H1501, the adhesion at the interface between the first and second sealants can be improved by adjusting the viscosity of each sealant because the main materials are composed of the same resin, thereby improving reliability. Similarly, when the sealant of the present invention is used as the first adhesive, not only the adhesion at the interface but also productivity can be significantly improved because the number of the sealants or apparatuses used can be decreased.

Further, the ink jet head configured as described above can be mounted on a recording apparatus so that the sealing member H1500 and a recording medium are opposed to each other. In such a case, it is desired for the sealing member H1500 to have high hardness. In each of the above-described examples, the cured product of a resin having an oxetane ring is used for the sealing member H1500, and thus the sealing member H1500 has sufficient hardness. This is possibly due to the fact that the number of methylene chains produced by ring opening of an oxetane ring during curing is increased to improve the brittleness of the cured product as compared with an epoxy compound generally used for sealing and having a similar skeleton. In this case, the Shore D hardness of the cured product is preferably 20 or more and more preferably 30 or more.

Next, an ink jet head having a back electrode configuration is described as configuration 2 in which electric connection is achieved at the back of a discharge orifice of a discharge element substrate. Namely, a description is made of a second embodiment of the present invention in which an electrode portion of an ink jet head having the configuration 2 is sealed with the sealant of the present invention.

(Second Example of Ink Jet Head)

Figure 7:
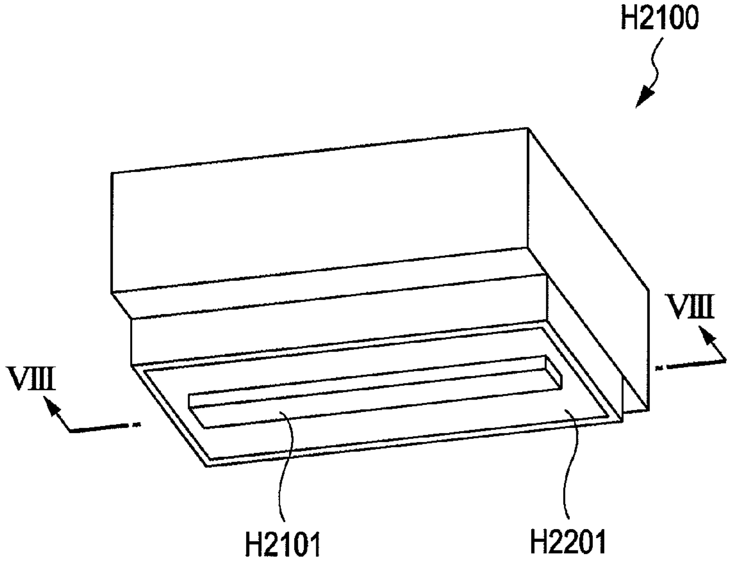
FIG. 7 is a perspective view showing an ink jet head with a back electrode configuration (second example of an ink jet head) according to an embodiment of the present invention.
Figure 8:
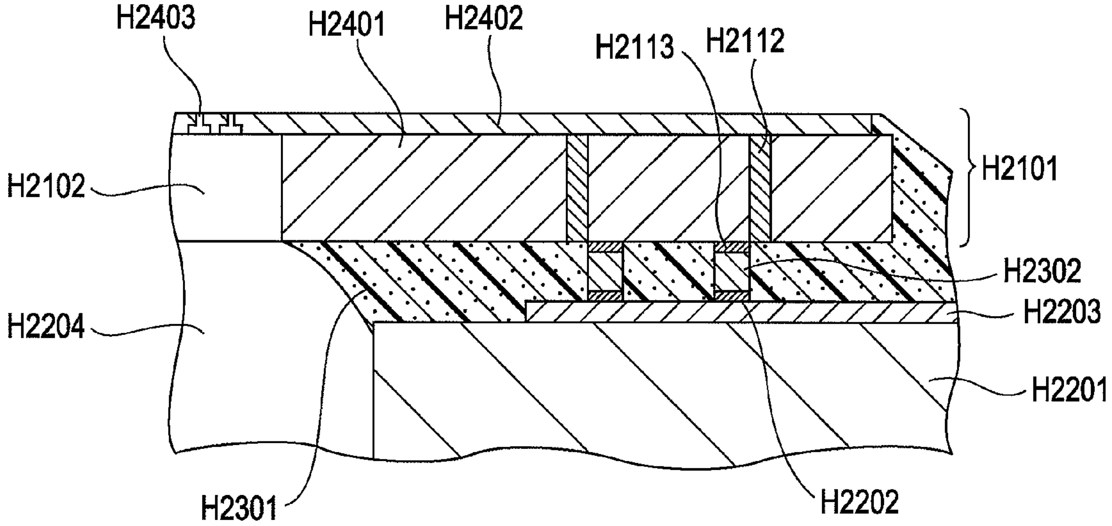
FIG. 8 is an enlarged sectional view of an end of a substrate in the longitudinal direction, taken along line VIII-VIII in FIG. 7.

FIG. 7 is a perspective view showing the appearance of the second example of an ink jet head in which the sealant of the present invention can be used. FIG. 8 is an enlarged sectional view of the vicinity of an electric connection portion taken along line VIII-VIII in FIG. 7.

Like in the first example, an ink jet head H2100 is provided with a discharge element substrate H2101. The discharge element substrate H2101 includes a substrate H2401, an energy generating element (not shown), and a nozzle portion H2402 having a discharge orifice H2403. The substrate H2401 is provided with through wiring H2112 passing through the substrate from the surface to the back of the substrate so that the wiring is connected to a driving electrode H2113 formed on the back of the substrate. The discharge element substrate H2101 is bonded, at the back side thereof through a bonding member H2301, to a support member H2201 provided with a wiring member on a surface of which a connection electrode H2202 is provided so that the driving electrode H2113 and the connection electrode H2202 are opposed to each other. The discharge orifice H2403 is provided so that a first ink supply port H2102 of the substrate H2401 and a second ink supply portion H2204 of the support member H2201 provided with the wiring member communicate with each other. The bonding member H2301 not only functions to bond together the discharge element substrate H2101 and the support member H2201 provided with the wiring member but also functions as a sealing member for covering the driving electrode H2113, the connection electrode H2202, and the wiring H2203 and isolating them from an ink. The support member H2201 provided with the wiring member may have a form in which wiring is stretched in the support member.

Figure 9A:
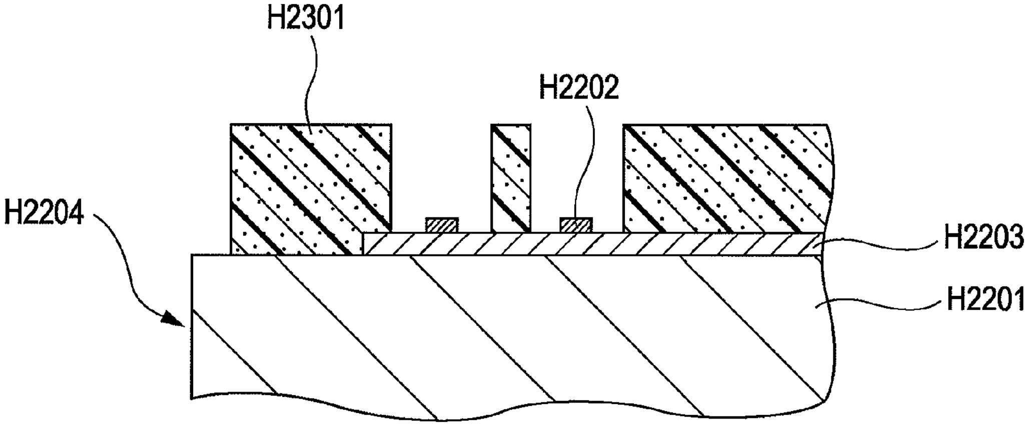
FIGS. 9A and 9B are enlarged views of the vicinity of an electric connection before bonding and after bonding, respectively, for illustrating a method for manufacturing a back electrode configuration (second example of an ink jet head) according to an embodiment of the present invention.
Figure 9B:
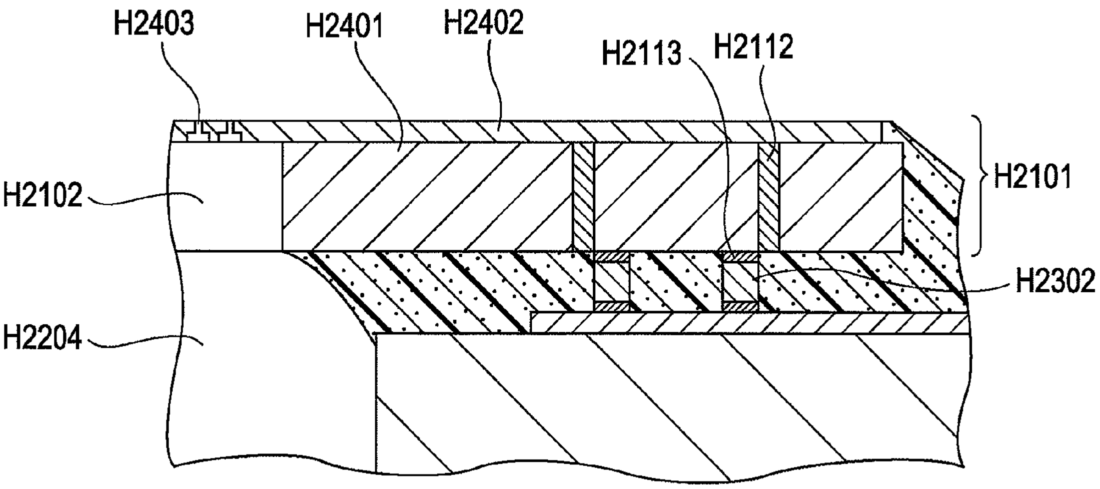

FIGS. 9A and 9B are schematic sectional views illustrating a manufacturing method including the steps of bonding the discharge element substrate H2101 and the support member H2201 through an adhesive and sealing the electrode portion in the second example of an ink jet head. FIGS. 9A and 9B are sectional views taken along the same line as in FIG. 8.

As shown in FIG. 9A, the sealant for an ink jet head of the present invention is applied as the adhesive H2301 by printing at a predetermined position of the support member H2201 provided with the wiring member.

As shown in FIG. 9B, a metal bump adhesive H2302 formed on the driving electrode H2113 of the discharge element substrate H2101 are opposed to the connection electrode H2202 of the support member H2201 provided with the wiring member so that both electrodes are connected to each other, followed by pressure bonding. The pressure bonding presses and extends the adhesive H2301 from the initial coating state and coats the connection portion and wiring H2203 with no space. Next, the adhesive H2301 is cured under predetermined curing conditions to form the adhesive member H2301. The connection of the electrode portion is maintained by curing shrinkage. As a result, bonding between the discharge element substrate H2101 and the support member H2201 provided with the wiring member, connection of the electrode portion, and sealing of the connection portion are completely achieved.

Although the adhesive H2301 is applied by printing in the above-descried step, a commonly used coating method such as dispensing may be used. In addition, the viscosity can be adjusted by adding an appropriate filler in order to obtain a required coating amount and coating thickness of the adhesive.

EXAMPLES (EXAMPLES 5 TO 8) AND COMPARATIVE EXAMPLES (COMPARATIVE EXAMPLES 4 AND 5) OF THE INK JET HEAD

In the first example of the ink jet head, the sealants of Examples 1 to 4 and Comparative Examples 1 and 2 (shown in Table 1) were used as a first sealant to form ink jet heads of Examples 5 to 8 and Comparative Examples 4 and 5. In the examples and the comparative examples, the thickness of the sealant from an electrode portion was constant, and curing conditions of the sealants included 100° C. for 1 hour and 180° C. for 1 hour.

EXAMPLES (EXAMPLES 9 TO 12) AND COMPARATIVE EXAMPLES (COMPARATIVE EXAMPLES 6 and 7) OF INK JET HEAD In the second example of the ink jet head, the sealants of Examples 1 to 4 and Comparative Examples 1 and 2 (shown in Table 1) were used as a first sealant to form ink jet heads of Examples 9 to 12 and Comparative Examples 6 and 7. In the examples and the comparative examples, the thickness of the sealant from an electrode portion was constant, and curing conditions of the sealants included 100° C. for 1 hour and 180° C. for 1 hour.

<Evaluation of Reliability>

In order to evaluate bonding reliability and electric connection reliability of the ink jet heads of Examples 5 to 12 and Comparative Examples 4 to 7, the above-described ink (i) was charged and stored at 60° C. for 2 months. Then, each of the ink jet heads was mounted on an ink jet recording apparatus to evaluate printing on 10,000 sheets of A4 paper.

The results of Examples 5 to 8 and Comparative Examples 4 and 5 are shown in Table 3, and the results of Examples 9 to 12 and Comparative Examples 6 and 7 are shown in Table 4.

TABLE 3

| | Example 5 | Example 6 | Example 7 | Example 8 | Comparative Example 4 | Comparative Example 5 |
|---|---|---|---|---|---|---|
| Evaluation of printing | Good | Good | Good | Good | Poor | Poor |

TABLE 4

| | Example 9 | Example 10 | Example 11 | Example 12 | Comparative Example 6 | Comparative Example 7 |
|---|---|---|---|---|---|---|
| Evaluation of printing | Good | Good | Good | Good | Poor | Poor |

In Comparative Examples 4 and 5, printing was stopped after printing on less than 7,000 sheets from the start. On the other hand, in Examples 5 to 8, printing could be performed with high quality and no problem after printing on 10,000 sheets.

In addition, in Comparative Examples 6 and 7, printing was stopped after printing on less than 5,000 sheets from the start. On the other hand, in Examples 9 to 12, printing could be performed with high quality and no problem after printing on 10,000 sheets.

It is supposed that in Comparative Examples 4 to 7, migration proceeds by the application of a voltage during printing or the adhesion of the sealant is decreased by storage of the ink, thereby causing short-circuiting due to scraping of the sealant.

<Paper Jam Test>

Figure 10:
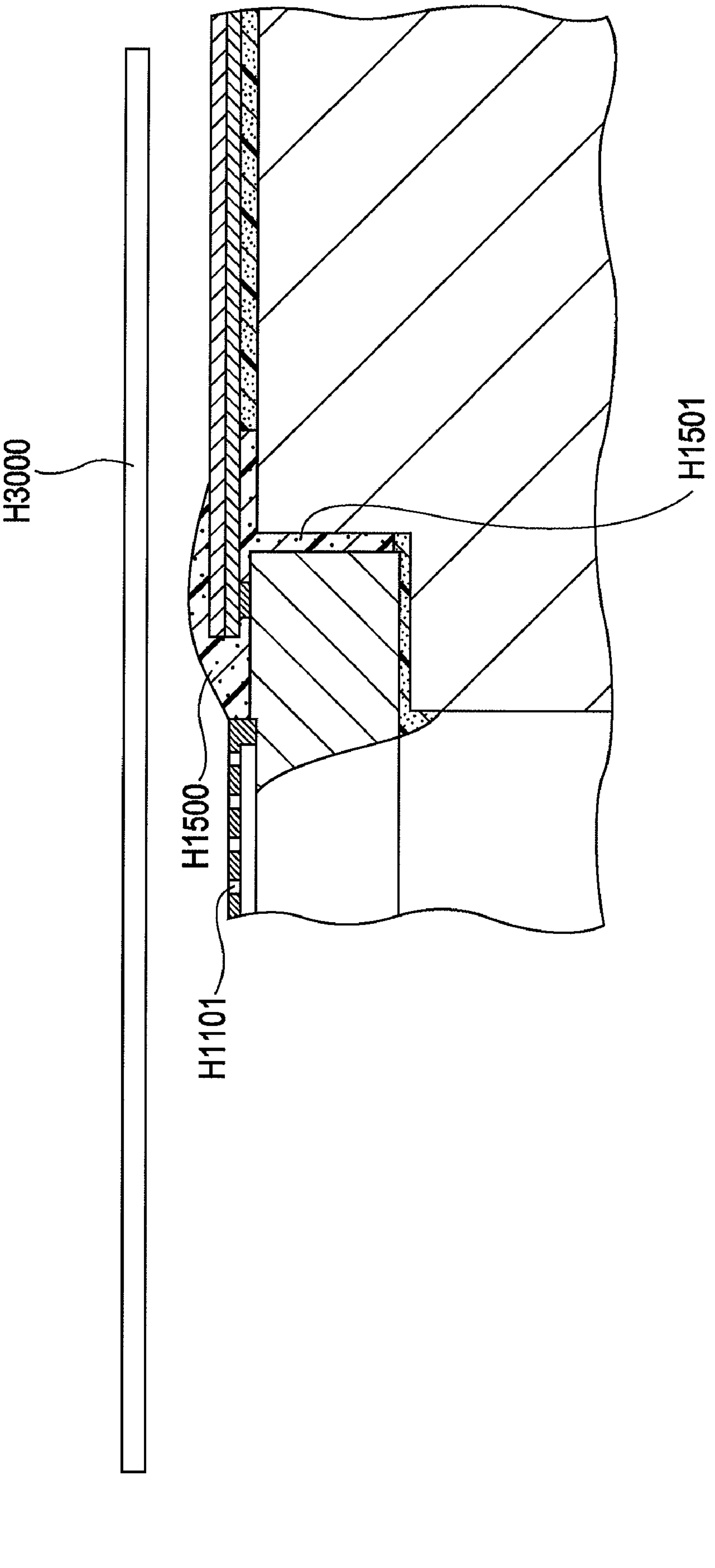
FIG. 10 is an enlarged partial view of an ink jet recording apparatus according to an embodiment of the present invention.

Each of the ink jet heads of Examples 5 to 8 was mounted on a recording apparatus so that a recording medium H3000 to be transferred is opposed to the first sealant H1501 as shown in FIG. 10, and a paper jam test was performed by double paper feeding.

As a result, a flaw having a practical problem was not observed on the sealant.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-161431 filed Jun. 19, 2007 which is hereby incorporated by reference herein in its entirety.

What is claimed is:

1. A sealant for an ink jet head comprising a composition containing:

an oxetane compound represented by general formula (I);

an alicyclic epoxy compound; and a cationic polymerization initiator:

General Formula (I)

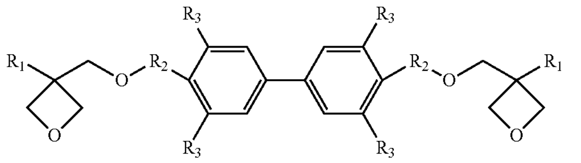

wherein $R_1$ represents an alkyl group, $R_2$ represents $—(CH_2)_p—$ (wherein p is 0 or 1), and $R_3$ represents a hydrogen atom or an alkyl group.

2. The sealant according to claim 1, wherein the alicyclic epoxy compound is represented by general formula (II):

General Formula (II)

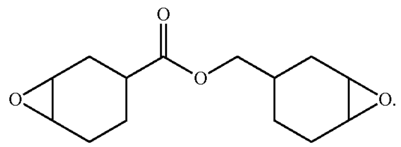

3. The sealant according to claim 1, wherein the amount of the oxetane compound relative to the total weight of the oxetane compound and the alicyclic epoxy compound is 40 parts by weight to 80 parts by weight.

4. A method of forming an ink jet head having a discharge element substrate with a discharge orifice for discharging an ink and an electric connection portion for electrically connecting the discharge element substrate, the method comprising a step of coating the electric connection portion with the sealant according to claim 1.

5. An ink jet head comprising:

a discharge element substrate including a discharge orifice discharging an ink and an energy generating element generating energy used for discharging the ink from the discharge orifice;

an electric connection portion for electrically connecting the discharge element substrate; and a sealing member for coating the electric connection portion, wherein the sealing member is composed of a cured product of a composition containing at least an oxetane compound represented by general formula (I), an alicyclic epoxy compound, and a cationic polymerization initiator:

General Formula (I)

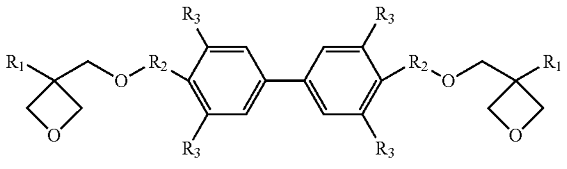

wherein $R_1$ represents an alkyl group, $R_2$ represents $-(CH_2)-$ (wherein p is 0 or 1), and $R_3$ represents a hydrogen atom or an alkyl group.

6. The ink jet head according to claim 5, wherein the alicyclic epoxy compound is represented by general formula (II):

General Formula (II)

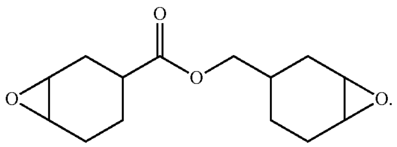

7. The ink jet head according to claim 5, wherein the electric connection portion is provided on the back of a surface of the substrate on which the energy generating element is provided.

8. A recording apparatus comprising:

an ink jet head for discharging an ink so that the ink discharged from the ink jet head is applied to a recording medium to perform recording, the ink jet head including:

a discharge element substrate including a discharge orifice discharging an ink and an energy generating element generating energy used for discharging the ink from the discharge orifice;

an electric connection portion for electrically connecting the discharge element substrate, the electric connection portion being opposed to the recording medium; and a sealing member for coating the electric connection portion, wherein the sealing member is composed of a cured product of a composition containing at least an oxetane compound represented by general formula (I), an alicyclic epoxy compound, and a cationic polymerization initiator:

General Formula (I)

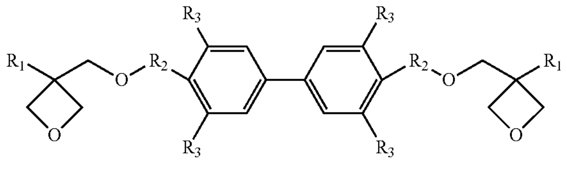

wherein $R_1$ represents an alkyl group, $R_2$ represents $-(CH_2)_p-$ (wherein p is 0 or 1), and $R_3$ represents a hydrogen atom or an alkyl group.

9. The recording apparatus according to claim 8, wherein the cured product has a Shore D hardness of 20 or more.

* * * * *